US009421651B2

(12) United States Patent
Yang et al.

(10) Patent No.: US 9,421,651 B2
(45) Date of Patent: Aug. 23, 2016

(54) MACHINE TOOL WITH LATHE TOOL AND SCRAPING CUTTER

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Tian-En Zhang, Jiashan (CN); Wei-Chuan Zhang, Jiashan (CN); Jian-Shi Jia, Jiashan (CN); Yang-Mao Peng, Jiashan (CN); Jian Qu, Jiashan (CN); Feng-Hua Chen, Jiashan (CN); Zhen-Guang Xu, Jiashan (CN); Jing-Shuang Sui, Jiashan (CN); Da-Qing Zhuang, Jiashan (CN); Jie Li, Jiashan (CN); Yi Liu, Jiashan (CN); Jian-Min Yu, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 446 days.

(21) Appl. No.: 14/070,717

(22) Filed: Nov. 4, 2013

(65) Prior Publication Data

US 2014/0165349 A1    Jun. 19, 2014

(30) Foreign Application Priority Data

Dec. 19, 2012  (CN) ........................... 2012 1 0554346

(51) Int. Cl.
*B23P 23/02*   (2006.01)
*B23B 11/00*   (2006.01)
(Continued)

(52) U.S. Cl.
CPC ................. *B23P 23/02* (2013.01); *B23B 3/065* (2013.01); *B23B 5/36* (2013.01); *B23D 7/02* (2013.01);
(Continued)

(58) Field of Classification Search
CPC ...... B23B 3/065; B23B 11/00; B23Q 39/022; B23Q 39/023; B23Q 39/024; Y10T 29/5109; Y10T 29/5114
USPC .......................................... 29/27 R, 27 C, 30
See application file for complete search history.

(56) References Cited

U.S. PATENT DOCUMENTS 437,284 A * 9/1890 Budlong ................... B23C 1/00
 29/30
1,970,810 A * 8/1934 Marx ....................... B23D 1/02
 29/30

(Continued)

FOREIGN PATENT DOCUMENTS

CN      101357490 A      2/2009
CN      101412185 A      4/2009
(Continued)

*Primary Examiner* — Erica E Cadugan
(74) *Attorney, Agent, or Firm* — ScienBiziP, P.C.

(57) ABSTRACT

A machine tool with lathe tool and scraping cutter includes a machine support, a worktable, a moving device, a lathe feeding mechanism and a scraping feeding mechanism. The worktable is positioned on the machine support. The moving device is slidably assembled to the machine support along a first direction and located above the worktable. The lathe feeding mechanism and the scraping feeding mechanism are slidably assembled to the moving device along a second direction perpendicular to the first direction, the lathe feeding mechanism includes a feeding assembly and a lathe tool connected to the feeding assembly, the feeding assembly is configured for driving the lathe tool to move along a third direction substantially perpendicular to the first and second direction reciprocally, the scraping feeding mechanism includes a scraping cutter and is configured for driving the scraping cutter to move along the third direction.

20 Claims, 7 Drawing Sheets

(51) Int. Cl.

| | | |
|---|---|---|
| *B23D 5/00* | (2006.01) | |
| *B23D 7/02* | (2006.01) | |
| *B23D 7/04* | (2006.01) | |
| *B23D 7/06* | (2006.01) | |
| *B23D 7/08* | (2006.01) | |
| *B23D 79/02* | (2006.01) | |
| *B23Q 1/01* | (2006.01) | |
| *B23Q 1/54* | (2006.01) | |
| *B23Q 1/62* | (2006.01) | |
| *B23Q 39/02* | (2006.01) | |
| *B23D 11/00* | (2006.01) | |
| *B23B 3/06* | (2006.01) | |
| *B23B 5/36* | (2006.01) | |
| *B23B 3/10* | (2006.01) | |
| *B23D 1/10* | (2006.01) | |
| *B23Q 5/28* | (2006.01) | |
| *B23Q 39/00* | (2006.01) | |

(52) U.S. Cl.
CPC .. *B23D 7/04* (2013.01); *B23D 7/06* (2013.01); *B23D 11/00* (2013.01); *B23D 79/02* (2013.01); *B23Q 1/012* (2013.01); *B23Q 1/017* (2013.01); *B23Q 39/024* (2013.01); *B23B 3/10* (2013.01); *B23D 1/10* (2013.01); *B23D 5/00* (2013.01); *B23D 7/08* (2013.01); *B23Q 1/5406* (2013.01); *B23Q 1/626* (2013.01); *B23Q 5/28* (2013.01); *B23Q 2039/008* (2013.01); *B23Q 2220/004* (2013.01); *B23Q 2230/004* (2013.01); *B23Q 2701/01* (2013.01); *B23Q 2701/025* (2013.01); *B23Q 2705/102* (2013.01); *B23Q 2705/106* (2013.01); *B23Q 2705/14* (2013.01); *Y10T 29/5109* (2015.01); *Y10T 29/5114* (2015.01); *Y10T 29/5115* (2015.01); *Y10T 29/5176* (2015.01); *Y10T 82/2511* (2015.01); *Y10T 82/2535* (2015.01); *Y10T 82/2541* (2015.01); *Y10T 82/2566* (2015.01); *Y10T 409/305824* (2015.01); *Y10T 409/500164* (2015.01); *Y10T 409/50246* (2015.01); *Y10T 409/506232* (2015.01); *Y10T 409/508036* (2015.01)

(56) References Cited

U.S. PATENT DOCUMENTS

| | | | | | |
|---|---|---|---|---|---|
| 2,079,735 | A | * | 5/1937 | Doran | B23C 9/00 29/30 |
| 3,757,638 | A | * | 9/1973 | Martin | B23D 7/10 173/160 |
| 4,570,313 | A | * | 2/1986 | Holmstrom | B23Q 3/12 29/26 A |
| 5,765,976 | A | * | 6/1998 | Ozaki | G05B 19/4103 318/573 |
| 5,839,323 | A | * | 11/1998 | Line | B23Q 1/012 408/37 |
| 6,073,323 | A | * | 6/2000 | Matsumoto | B23B 3/161 29/27 C |
| 6,394,892 | B2 | * | 5/2002 | Hanisch | B23Q 1/52 451/177 |
| 6,618,917 | B2 | * | 9/2003 | Sugiura | B23B 3/162 29/27 C |
| 7,179,030 | B2 | * | 2/2007 | Krosta | B23Q 1/017 408/234 |
| 7,544,025 | B2 | * | 6/2009 | Hillinger | B23Q 1/282 408/13 |
| 8,529,420 | B2 | * | 9/2013 | Meidar | B23Q 1/012 29/33 P |
| 2010/0111632 | A1 | * | 5/2010 | Tingley, III | B23D 13/00 409/293 |
| 2010/0313718 | A1 | | 12/2010 | Meidar et al. | |
| 2014/0165348 | A1 | * | 6/2014 | Yang | B23B 3/065 29/56.5 |
| 2014/0165371 | A1 | * | 6/2014 | Yang | B23B 3/06 29/558 |
| 2014/0165372 | A1 | * | 6/2014 | Yang | B23P 13/02 29/558 |
| 2014/0165373 | A1 | * | 6/2014 | Yang | B23P 13/02 29/558 |
| 2014/0165374 | A1 | * | 6/2014 | Yang | B23P 13/02 29/558 |
| 2014/0165375 | A1 | * | 6/2014 | Yang | B23P 13/02 29/558 |
| 2014/0169901 | A1 | * | 6/2014 | Yang | B23C 3/12 409/132 |
| 2014/0172145 | A1 | * | 6/2014 | Yang | B23Q 39/024 700/160 |
| 2014/0172146 | A1 | * | 6/2014 | Yang | B23Q 39/024 700/160 |
| 2015/0056037 | A1 | * | 2/2015 | Wilson | B23D 5/02 409/289 |

FOREIGN PATENT DOCUMENTS

| | | |
|---|---|---|
| CN | 201483235 U | 5/2010 |
| CN | 201524905 U | 7/2010 |
| CN | 201603999 U | 10/2010 |
| CN | 202192431 U | 4/2012 |
| CN | 101870063 B | 6/2012 |
| CN | 102528170 A | 7/2012 |
| DE | 19650360 A1 | 5/1998 |
| DE | 102009058649 A1 | 6/2011 |
| DE | 102011105402 A1 | 12/2012 |
| DE | 102014011199 A1 * | 1/2016 |
| EP | 1952937 A1 | 8/2008 |
| JP | 63-123603 A * | 5/1988 |
| JP | 2000-158256 A | 6/2000 |
| JP | 2004-130468 A | 4/2004 |
| JP | 2007000966 A | 1/2007 |
| JP | 2008-183666 A | 8/2008 |
| TW | M286741 | 2/2006 |
| WO | 03103896 A1 | 12/2003 |

* cited by examiner

MACHINE TOOL WITH LATHE TOOL AND SCRAPING CUTTER

CROSS-REFERENCE TO RELATED APPLICATIONS

This application claims all benefits accruing under 35 U.S.C. §119 from China Patent Application No. 201210554346.7, filed on Dec. 19, 2012, in the China Intellectual Property Office, the disclosure of which is incorporated herein by reference. The application is also related to co-pending applications entitled, "METHOD FOR MACHINING METALLIC MEMBER USING LATHING AND MILLING" (application Ser. No. 14/070,671); "METHOD FOR MACHINING METALLIC MEMBER USING LATHING AND MILLING" (application Ser. No. 14/070,681); "METHOD FOR MACHINING METALLIC MEMBER USING LATHING AND SCRAPING" (application Ser. No. 14/070,688); "METHOD FOR MACHINING METALLIC MEMBER USING LATHING AND SCRAPING" (application Ser. No. 14/070,694); "METHOD FOR MACHINING METALLIC MEMBER USING LATHING AND SCRAPING" (application Ser. No. 14/070,699); "MACHINE TOOL WITH LATHE TOOL AND MILLING CUTTER" (application Ser. No. 14/070,705); "MACHINE CONTROL SYSTEM EMPLOYING LATHE TOOL AND MILLING CUTTER" (application Ser. No. 14/070,722), "MACHINE CONTROL SYSTEM EMPLOYING LATHE TOOL AND SCRAPING CUTTER" (application Ser. No. 14/070,728), "MILLING METHOD FOR MACHINING METALLIC MEMBER" (application Ser. No. 14/070,736).

BACKGROUND

1. Technical Field

The present disclosure generally relates to a machine tool, and particularly, to a machine tool with lathe tool and scraping cutter.

2. Description of the Related Art

An electronic device such as a tabletop computer or a mobile phone, employs a metallic member as a housing. The metallic member includes a top portion and a peripheral sidewall extending from a peripheral edge of the top portion. The top portion has a greater surface area than that of the peripheral sidewall and has a non-circular flat surface or non-circular curved surface. The peripheral sidewall has four side surfaces arranged in order and four corners each connecting two adjacent surfaces. In related manufacturing fields, if a scraping process is employed to machine the metallic member, some tracks occur on the top portion that has been milled because of intermittent contact and interrupted scraping of the scraping cutter. Then a polishing process needs to be applied for a better appearance, thus the efficiency of the scraping process is reduced. If a lathe process is adopted to machine the metallic member, it is difficult to machine tool a surface which is not made for rotating. The lathe is not suitable to machine the peripheral sidewalls because of the four corners of the peripheral sidewall. Thus a number of additional machining processes must be added to machine the metallic member.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
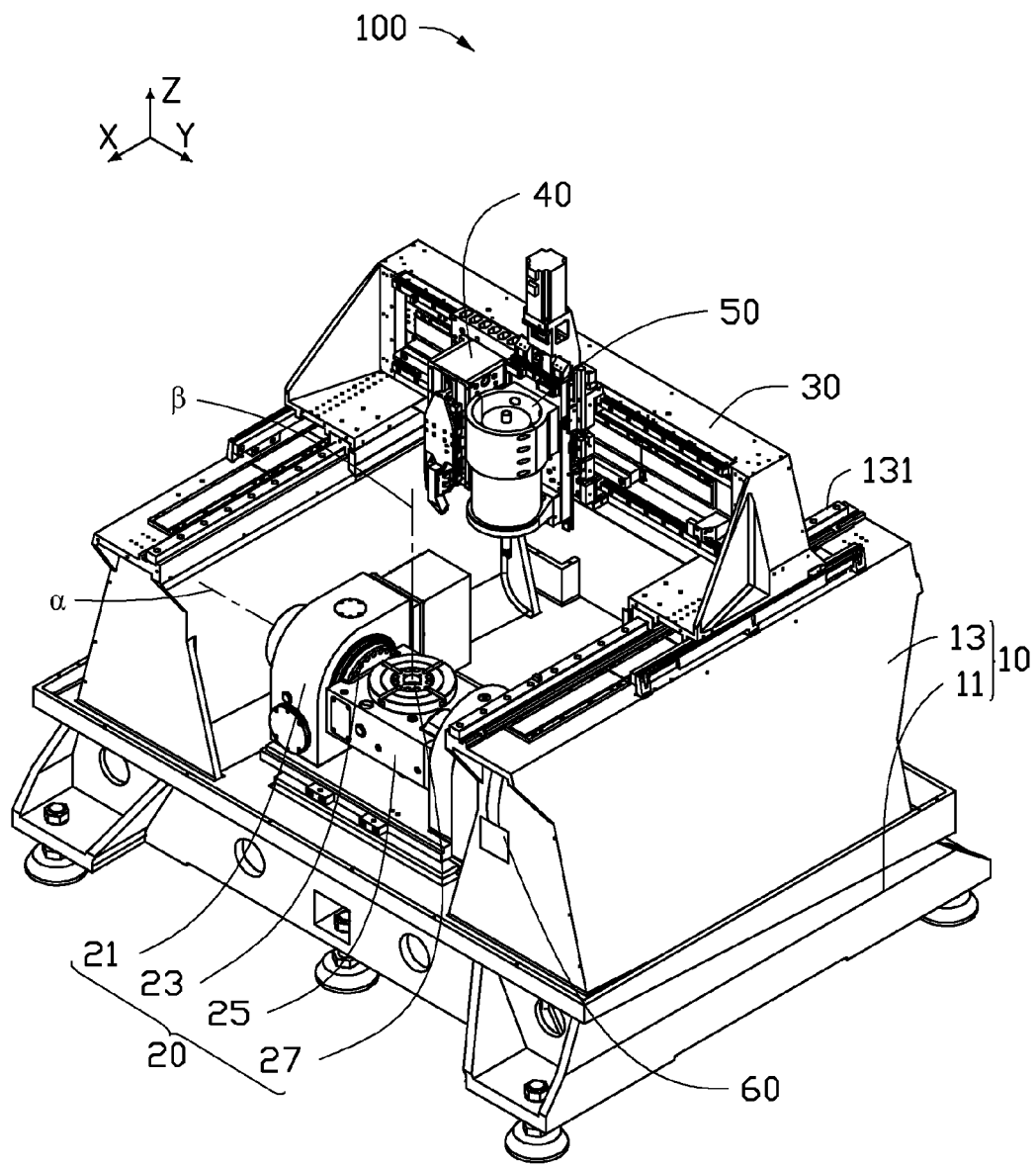
FIG. 1 is an isometric view of a first embodiment of a machine tool equipped with a lathe feeding mechanism and a scraping feeding mechanism, and a worktable.
Figure 2:
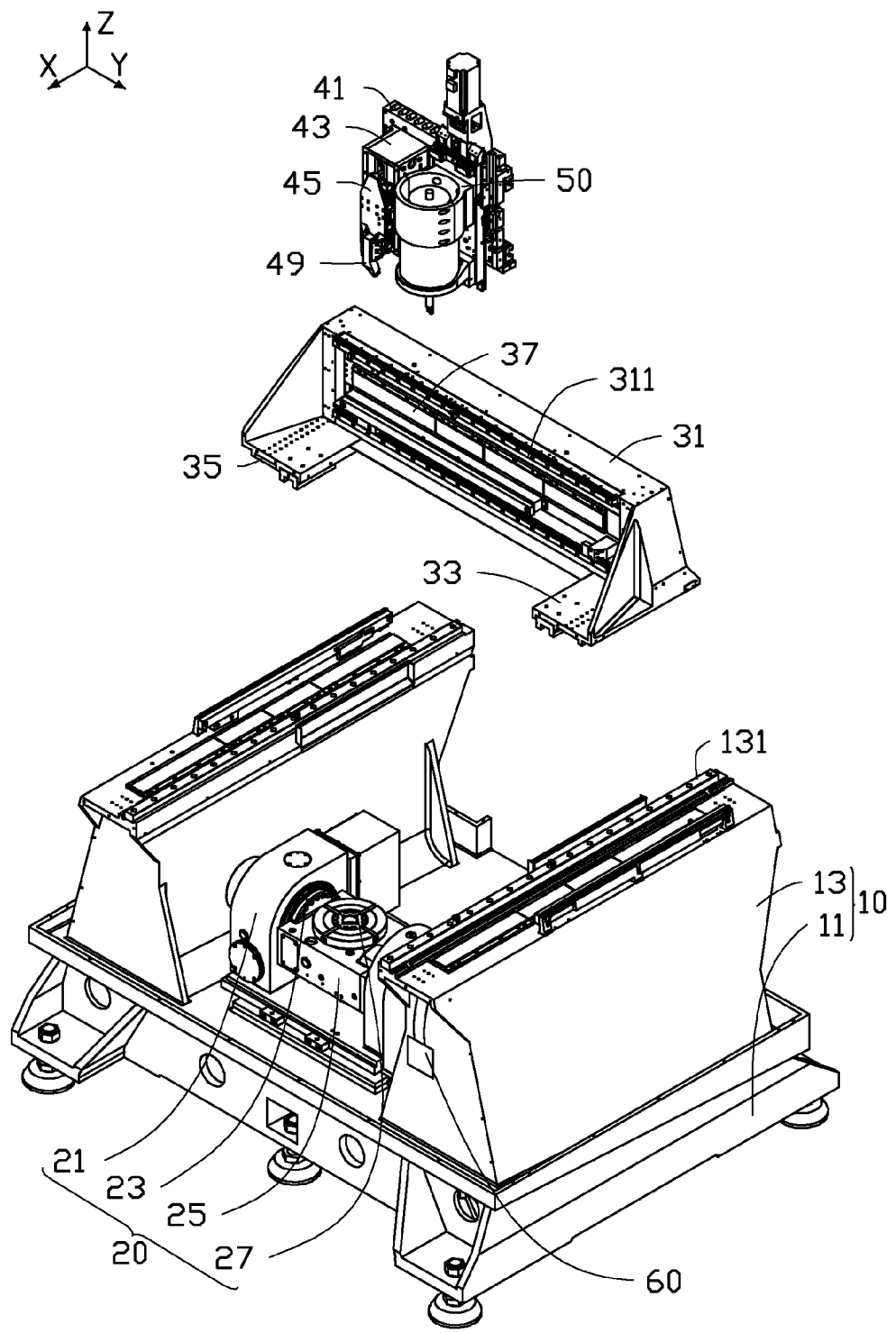
FIG. 2 is an exploded, isometric view of the machine tool of FIG. 1.
Figure 5:
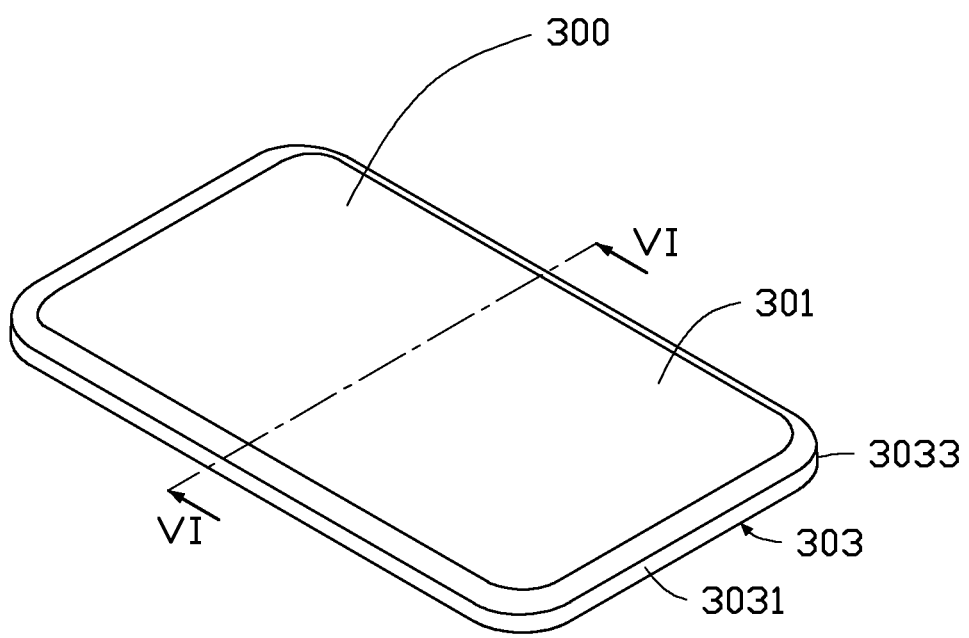
FIG. 5 is an isometric view of a metallic member to be machined.

FIGS. 1 and 2 show a first embodiment of a machine tool 100 for machining a metallic member 300 (see FIG. 5). The machine tool 100 includes a machine support 10, a worktable 20, a moving device 30, a lathe feeding mechanism 40, a scraping feeding mechanism 50, and a controller 60. The worktable 20 holds a workpiece in place and is supported by the machine support 10. The moving device 30 is movably positioned on the machine support 10 above the worktable 20. The lathe feeding mechanism 40 and the scraping feeding mechanism 50 are arranged side by side and slidably mounted on the moving device 30. The controller 60 is electrically connected to the worktable 20, the moving device 30, the lathe feeding mechanism 40, and the scraping feeding mechanism 50 for controlling the machine tool 100. Under the control of the controller 60, the moving device 30 can be driven to move with the lathe feeding mechanism 40 and the scraping feeding mechanism 50, such that the lathe feeding mechanism 40 and the scraping feeding mechanism 50 can be driven three-dimensionally along Cartesian coordinates, that is, along the X, the Y, and the Z axes.

The machine support 10 includes a base 11 and a pair of support bodies 13 positioned on the base 11. The pair of support bodies 13 is parallel to each other and arranged apart from each other. Each support body 13 includes a first sliding rail 131 on a surface away from the base 11. In the illustrated embodiment, the first sliding rail 131 extends substantially parallel to the X-axis (a first direction).

The worktable 20 is rotatably positioned on the base 11 between the two support bodies 13. The worktable 20 includes a pair of mounting bases 21, a first rotating member 23, a rotating shaft 25, and a second rotating member 27. The pair of mounting bases 21 is located in the middle portion of the base 11, in parallel. The pair of mounting bases 21 is located between the two support bodies 13. The first rotating member 23 is mounted on one mounting base 21. The rotating shaft 25 interconnects the first rotating member 23 and the other one mounting base 21. The first rotating member 23 is capable of rotating the rotating shaft 25 around an $\alpha$ axis. The $\alpha$ axis is parallel to the Y-axis but not co-linear (a second direction). The second rotating member 27 is positioned on a middle portion of the rotating shaft 25, and capable of rotating the metallic member 300 placed thereupon around an $\beta$ axis. The $\beta$ axis is parallel to the Z-axis (a third direction) but not co-linear. The first rotating member 23 and the second rotating member 27 are electrically connected to the controller 60.

In the illustrated embodiment, the first rotating member 23 and the second rotating member 27 are direct drive motors.

The moving device 30 is slidably mounted on the pair of support bodies 13 and located above the worktable 20. The moving device 30 includes a cross beam 31, a pair of sliding bases 33, a pair of first driving mechanisms 35, and a second driving mechanism 37. The extending direction of the cross beam 31 is substantially parallel to the Y-axis. Opposite ends of the cross beam 31 are slidably positioned on the support bodies 13. The cross beam 31 includes a pair of second sliding rails 311 positioned on a side surface and extending substantially parallel to the Y-axis. The pair of sliding bases 33 is installed on the opposite ends of the cross beam 31 to slidably connect with the first sliding rail 131. The first driving mechanism 35 is mounted on a surface of the sliding base 33 away from the cross beam 31 and located adjacent to an end of the first sliding rail 131. The pair of first driving mechanism 35 is employed to drive the cross beam 31 to move along the X-axis direction.

The second driving mechanism 37 is mounted on the cross beams 31 to drive the lathe feeding mechanism 40 and the scraping feeding mechanism 50 to move along the second sliding rails 311. The first driving mechanism 35 and the second driving mechanism 37 are electrically connected to the controller 60. In the illustrated embodiment, the first driving mechanisms 35 and the second driving mechanism 37 are high performance linear motors. In other embodiments, the first driving mechanisms 35 and the second driving mechanism 37 may be other drivers, such as hydraulic cylinders or rams. The number of the first driving mechanisms 35, and the second driving mechanism 37 may be set according to the application.

Figure 3:
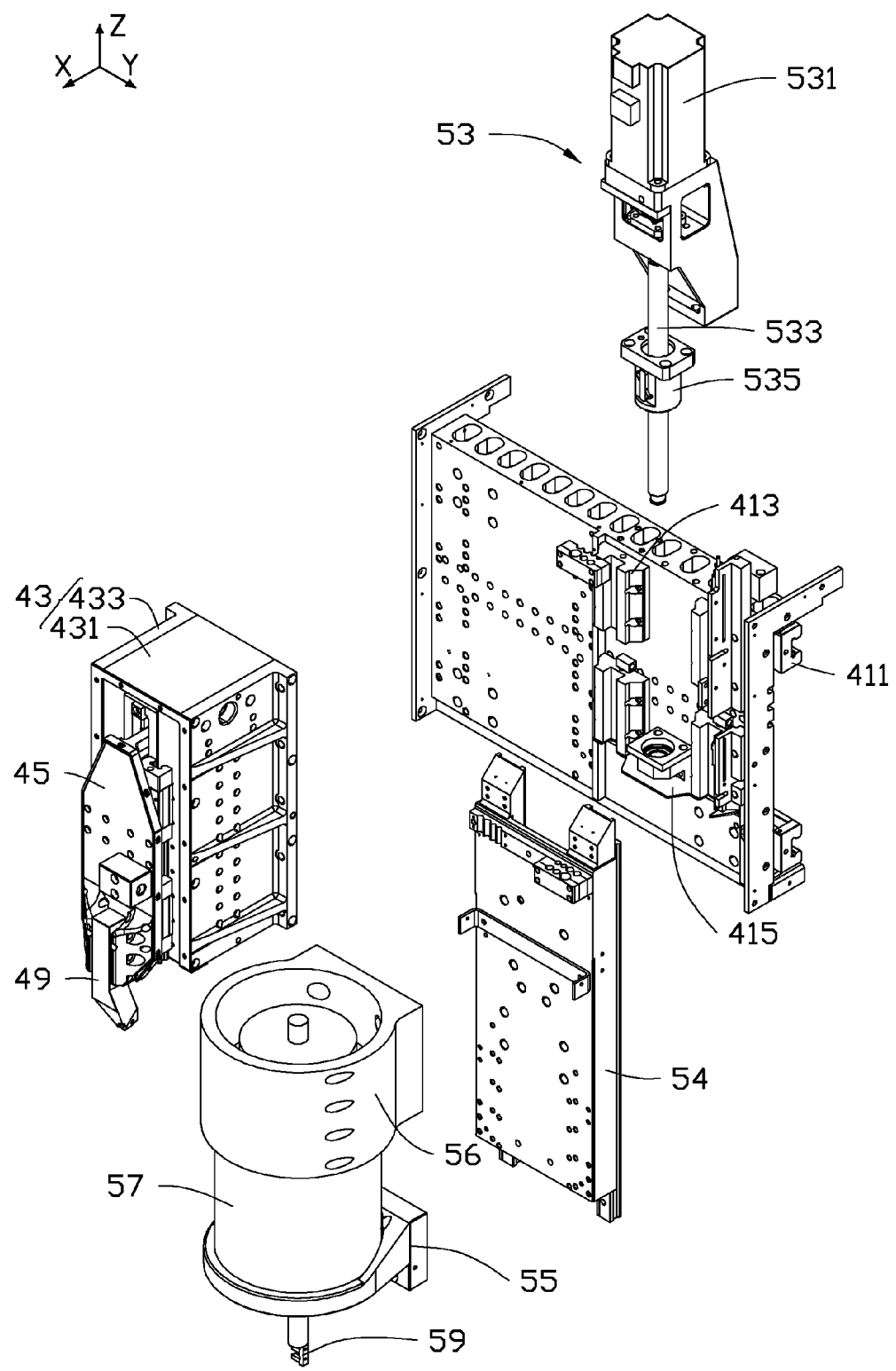
FIG. 3 is a partial, exploded, isometric view of the lathe feeding mechanism and the scraping feeding mechanism of FIG. 2.
Figure 4:
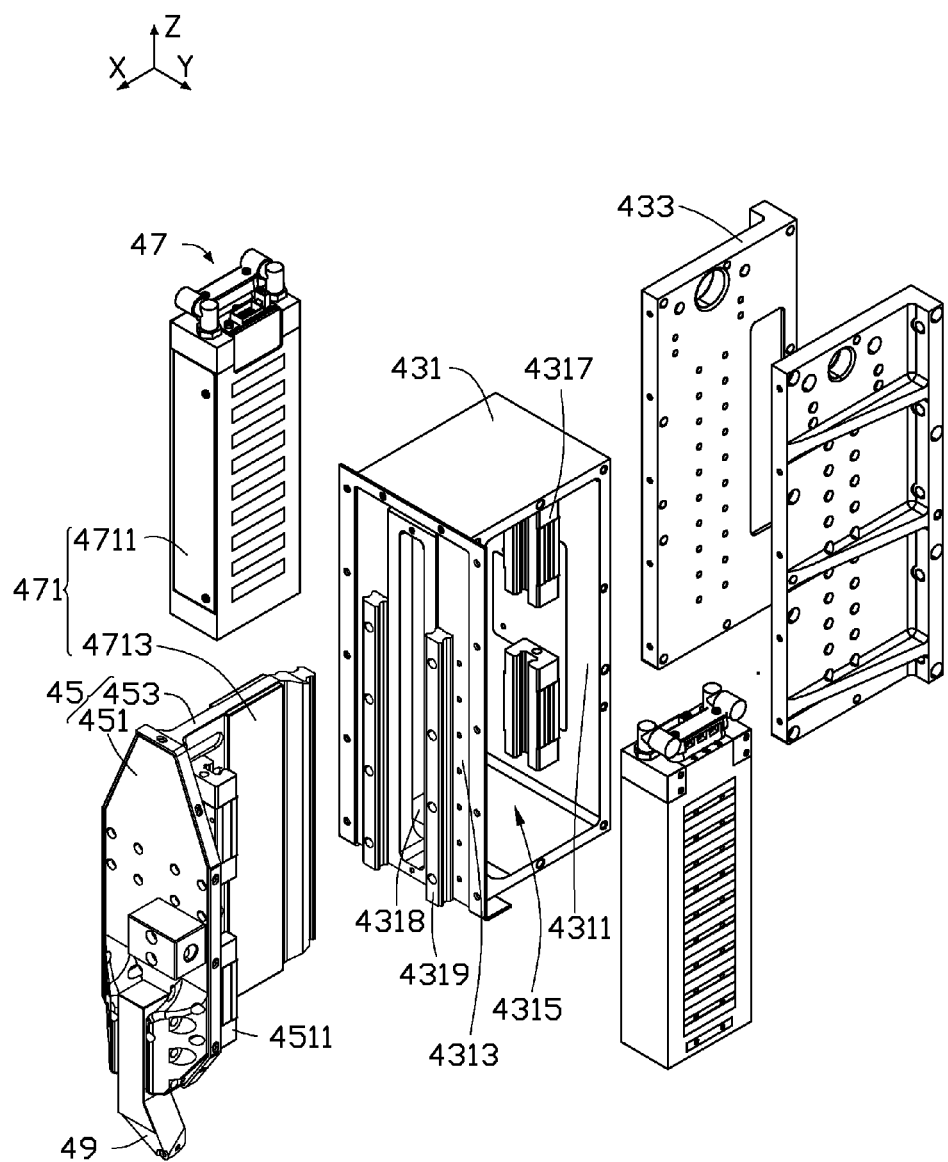
FIG. 4 is an exploded, isometric view of the lathe feeding mechanism of FIG. 3.

FIGS. 3 to 4 show the lathe feeding mechanism 40 slidably positioned on the cross beams 31. The lathe feeding mechanism 40 includes a sliding saddle 41 (see FIG. 2), a mounting seat 43, a tool holder 45, a feeding assembly 47, and a lathe tool 49. The sliding saddle 41 is assembled to the cross beams 31 and movably engages with the pair of second sliding rails 311. The sliding saddle 41 is driven by the second driving mechanism 37 to slide along the Y-axis direction together with the lathe feeding mechanism 40 and the scraping feeding mechanism 50. The sliding saddle 41 is equipped with four guiding rails 413 extending along the Z-axis direction. The four guiding rails 413 are divided in two sets spaced from each other by two-two type. The sliding saddle 41 further includes a mounting block 415 adjacent to the base 11. The mounting block 415 is located between the two sets of guiding rails 413. The mounting seat 43 is assembled to the sliding saddle 41 and spaced from the four guiding rails 413.

The mounting seat 43 includes a frame 431 and two mounting boards 433 assembled to opposite sides of the frame 431. The frame 431 includes a first side wall 4311 and a second side wall 4313. The first side wall 4311 and the second side wall 4313 are positioned substantially parallel to each other and cooperatively define a receiving space 4315. The first side wall 4311 is connected with the sliding saddle 41. Two separate guiding portions 4317 protrude from an inner surface of the first side wall 4311 facing the second side wall 4313 and extend substantially parallel to the Z-axis. A through groove 4318 is defined in the second side wall 4313 extending along a direction substantially parallel to the Z-axis corresponding to the guiding portions 4317. Two sliding portions 4319 protrude from an outer surface of the second side wall 4313 at two sides of the through groove 4318. In the illustrated embodiment, the sliding portions 4319 are sliding rails, and the frame 431 is integrally formed. The two mounting boards 433 are installed on two opening sides of the frame 431. Each mounting board 433 is connected substantially perpendicularly to the first side wall 4311 and the second side wall 4313 to close the two opening sides of the frame 431.

The tool holder 45 slidably connects with the mounting seat 43. The tool holder 45 is substantially "T" shaped, and includes a main body 451 and a sliding board 453 protruding substantially perpendicularly from the main body 451. The main body 451 is a bar of material tapering at both ends, and positioned outside of the mounting seat 43. Two distanced holding portions 4511 are positioned on a surface of the main body 451 facing the sliding board 453. The two holding portions 4511 slidably engage with the pair of sliding portions 4319 of the mounting seat 43. The sliding board 453 passes through the through groove 4318 and is slidably assembled to the two guiding portions 4317, dividing the receiving space 4315 into two parts.

The feeding assembly 47 is mounted in the mounting seat 43, and includes two drivers 471 electrically connected to the controller 60. The two drivers 471 are capable of reciprocating the tool holder 45 at a high speed along the direction of the Z-axis, relative to the guiding portions 4317 and the sliding portions 4319. The two drivers 471 are received in the receiving space 4315 and positioned on two sides of the sliding board 453. In the illustrated embodiment, the drivers 471 are linear motors. Each driver 471 includes a drive 4711 and a stator 4713. Each drive 4711 is fixed to a surface of each of the mounting boards 433. The sliding board 453 is positioned between the two drives 4711. The two stators 4713 are positioned on the opposite surfaces of the sliding board 453. In other embodiments, the number of drivers 471 may be set according to application. For example, the two drivers 471 can replace a single driver with more power, or three or more drivers can be positioned to drive the tool holder 45 to maximize the available power, and the assembly of the drivers is simpler.

The lathe tool 49 is fastened to the main body 451 of the tool holder 45 adjacent to the base 11.

The scraping feeding mechanism 50 includes a linear driving assembly 53, a linking board 54, a fixing seat 55, a mounting seat 56, a rotatable driving member 57 and a scraping cutter 59. The linear driving assembly 53 includes a driving member 531, a leading rod 533, and a nut 535. The driving member 531 is mounted on the sliding saddle 41 above the cross beam 31. The leading rod 533 interconnects the driving member 531 and the mounting block 415. The nut 535 is sleeved on the leading rod 533 and engages with the leading rod 533. The linking board 54 is slidably assembled to the two sets of guiding rails 413 and fixed to the nut 535. The fixing seat 55 is assembled to a side surface of the linking board 54 opposite to the leading rod 533 and adjacent to the base 11. The mounting seat 56 is mounted on an end of the linking board 54 opposite to the fixing seat 55. The rotatable driving member 57 extends through the fixing seat 55 and the mounting seat 56, and rotatably supported by the fixing seat 55. The scraping cutter 59 is mounted on an end of the rotatable driving member 57 adjacent to the base 11. The driving member 531 is capable of rotating the leading rod 533 and driving the linking board 54, the rotatable driving member 57 and the scraping cutter 59 to slide along an axis parallel to the Z direction. The rotatable driving member 57 is capable of rotating the scraping cutter 59 along the axis parallel to the Z direction. The scraping cutter 59 is driven by the sliding saddle 41 along X/Y-axis directions, and driven by the linear driving assembly 53 to slide along the Z-axis direction.

In assembly, the worktable 20 is positioned between the two support bodies 13. The cross beam 31 is installed on the two support bodies 13 via the pair of sliding bases 33. The pair of first driving mechanisms 35, and the second driving mechanism 37 are mounted on the base 11 and the cross beam 31, respectively. The lathe feeding mechanism 40 and the scraping feeding mechanism 50 are mounted to the cross beam 31 side by side. The worktable 20, the moving device 30, the lathe feeding mechanism 40, and the scraping feeding mechanism 50 are electrically connected to the controller 60.

Figure 6:
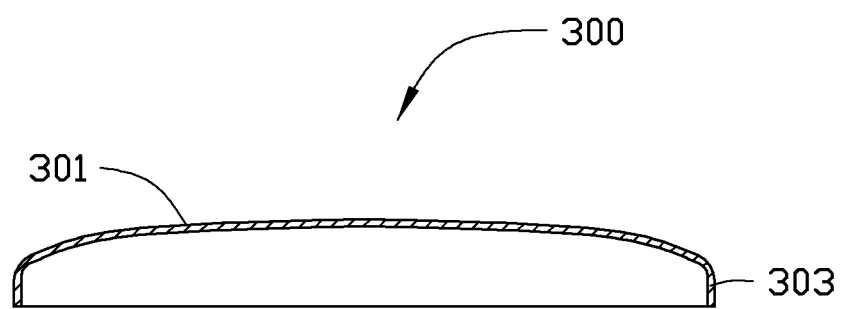
FIG. 6 is a sectional view of the metallic member of FIG. 5, taken along line VI-VI of FIG. 5.

FIGS. 5 and 6 show that the metallic member 300 to be machined is a housing of a tablet computer or a mobile phone. The metallic member 300 is substantially rectangular, and includes a top portion 301 and a peripheral sidewall 303 extending from a peripheral edge of the top portion 301. The top portion 301 has a non-circular curved surface with a relatively greater surface area than that of the peripheral sidewall 303. In the embodiment, the peripheral sidewall 303 has four side surfaces 3031 arranged in order and adjacent two of the four side surfaces 3031 are connected by a corner 3033. The four side surfaces 3031 are substantially planar surfaces, each corner 3033 interconnects two adjacent side surfaces 3031.

When working, the metallic member 300 is placed and held on the worktable 20. The pair of first driving mechanisms 35 drives the cross beam 31 to slide along the X-axis, and the second driving mechanism 37 drives the lathe feeding mechanism 40 to move along the Y-axis, until the lathe tool 49 arrives at an original position above the worktable 20 for machining. In the embodiment, the original position is located above a middle portion of the metallic member 300. Finally, the second rotating member 27 drives the metallic member 300 to rotate around the $\beta$ axis, simultaneously, the pair of feeding assemblies 47 drives the lathe tool 49 to move backwards and forwards at a high speed along the Z-axis according to the depth of cutting required for each machining portion of the top portion 301 to machine the metallic member 300 circumferentially. The moving speed, the moving range of the lathe tool 49, and the rotating speed of the second rotating member 27 are set according to an application. A track of the lathe tool 49 projected to a top of the metallic member 300 is a spiral curve. When the lathe tool 49 accomplishes the machining of the top portion 301, the lathe tool 49 moves away from the metallic member 300 and stops working.

The pair of first driving mechanisms 35 drives the cross beam 31 to slide along the X-axis, and the second driving mechanism 37 drives the lathe feeding mechanism 40 to move along the Y-axis, such that the scraping cutter 59 arrives at a position above an end of one side surface 3031 of the peripheral sidewall 303. Then, the linear driving assembly 53 drives the scraping cutter 59 to slide along the two sets of guiding rails 413 until the scraping cutter 59 resists the peripheral sidewall 303 of the metallic member 300. The moving device 30 moves the scraping cutter 59 along a predetermined path to scrape the side surface 3031 of the peripheral sidewall 303. When the scraping cutter 59 arrives at a corner 3033, the rotatable driving member 57 drives the scraping cutter 59 to rotate to a certain angle, thereby enabling the scraping cutter 59 to scrape the side surface 3031 and the corner 3033. Then the scraping cutter 59 scrapes the next side surface 3031. When finished scraping, the scraping cutter 59 is driven upward by the linear driving assembly 53. The moving device 30 moves back to an original position, and the metallic member 300 is removed from the machine tool 100. The scraping feeding mechanism 50 may remain still, the worktable 200 rotates the metallic member 300 to enable the scraping feeding mechanism 50 to scrape the next side surface 3031 of the metallic member 300. When a particular portion of the metallic member 300 is to be machined, the rotating member 25 rotates the metallic member 30 along $\alpha$ axis, the second rotating member 27 rotates the metallic member 300 along the $\beta$ axis, thereby positioning the metallic member 300 in a particular position for machining.

The lathe feeding mechanism 40 is capable of reciprocating along the Z-axis toward the metallic member 300 at a high speed, thereby a non-interrupted machining process is achieved, the finish of the top portion 301 is enhanced, additional surface processing to the top portion is omitted. The moving device 30 is capable of driving the scraping cutter 59 to move, thereby scraping the side surface 3031 of the peripheral sidewall 303. The rotatable driving member 57 is capable of driving the scraping cutter 59 to rotate to a certain angle, thereby enabling the scraping cutter 59 to scrape the corner 3033 and subsequently machine the next side surface 3031, such that a scraping accuracy and a scraping efficiency are enhanced. The metallic member 300 can be machined by the lathe tool 49 and the scraping cutter 59 without disassembly/assembly to adapt to different machines, thereby enhancing a position accuracy, a machining efficiency and a yield of the metallic member 300. Because the moving device 30 is capable of moving the lathe feeding mechanism 40 and the scraping feeding mechanism 50 along the X/Y directions, the lathe tool 49 and the scraping cutter 59 can be moved along Z direction, the worktable 200 is capable of driving the metallic member 300 to rotate along the $\alpha$ axis and the $\beta$ axis, such that the machining process is more convenient and the machining efficiency is enhanced.

The machine tool 100 may merely be employed to lathe or scrape the metallic member 300. The lathe tool 49 may not only machine the top portion 301, but also machine the workpiece in other shapes. The scraping feeding mechanism 50 may not only scrape the peripheral sidewall 303, but also scrape a hole or a groove on the metallic member 300 or chamfer the metallic member 300.

The sliding saddle 41, the mounting seat 43, the tool holder 45 may be omitted. The pair of feeding assemblies 47 may be substituted by other driving assembly assembled to the pair of second guiding rails 311. The driving assembly is capable of directly reciprocating the lathe tool 49 along the Z direction at a high speed.

The scraping feeding mechanism 50 may be not assembled to the sliding saddle 41, but is assembled to a sliding plate (not shown) slidably mounted on the pair of second guiding rails 311, such that the lathe feeding mechanism 40 and the scraping feeding mechanism 50 may be controlled independently.

The driving member 531, the leading rod 533, and the nut 535 may be substituted by other driving assembly, such as a linear cylinder. The linear cylinder is assembled to the pair of second guiding rails 311, the rotatable driving member 57 is mounted on an output shaft of the linear cylinder. Accordingly, the linking board 54 of the scraping feeding mechanism 50 may be omitted.

The worktable 20 may include the second rotating member 27 only, the second rotating member 27 is assembled to the base 11, and rotates around the $\beta$ axis only. The worktable 20 may be a multi-axis worktable, and rotates the metallic member 300 along a plurality of axis to enable a multi-workstations machining.

Figure 7:
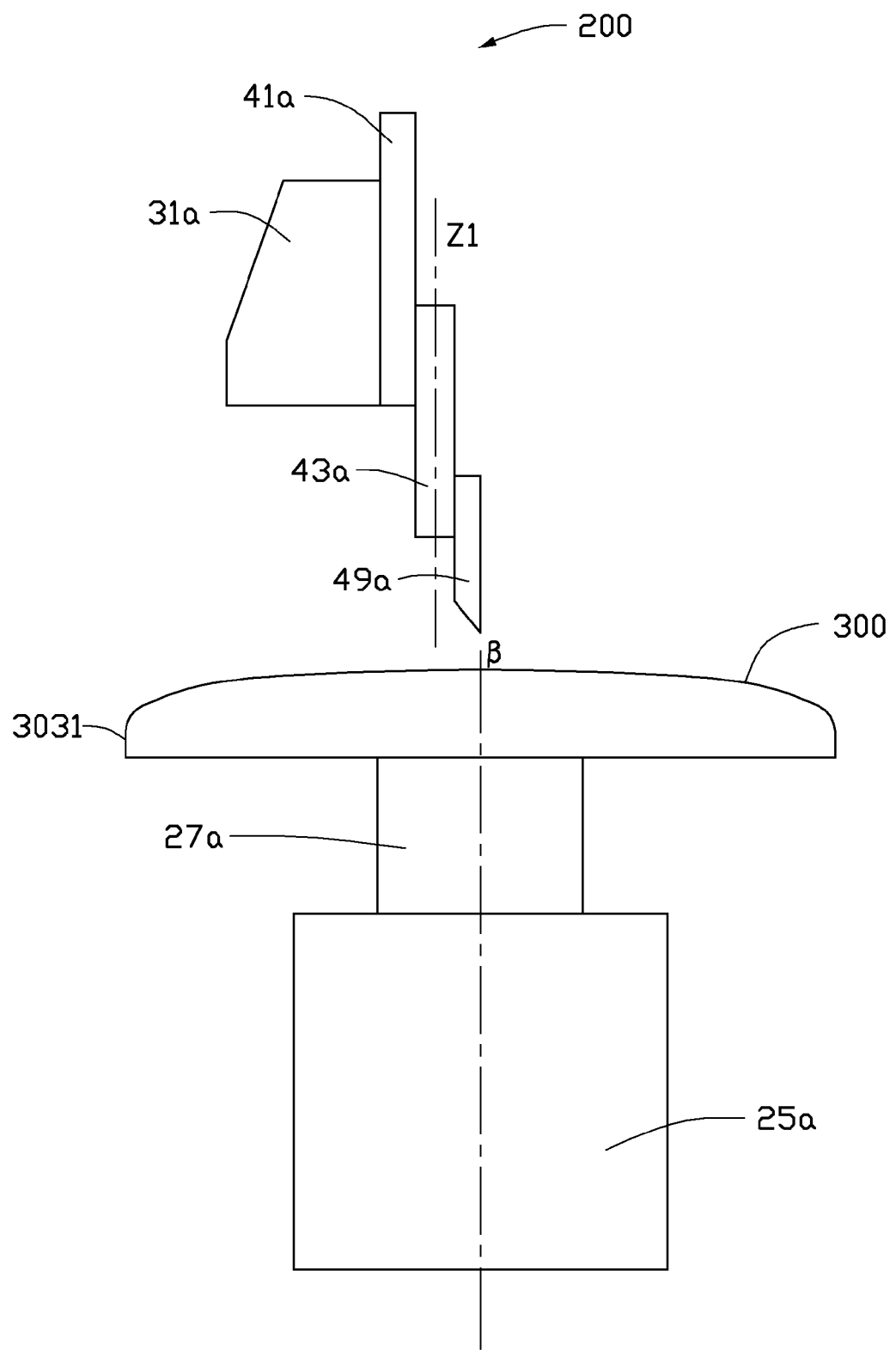
FIG. 7 is a schematic view of a second embodiment of the machine tool with a part thereof removed.

FIG. 7 shows a second embodiment of machine tool 200 for machining the metallic member 300. The machine tool 200 is similar to the machine tool 100 in structure, a sliding saddle 41a is slidably assembled to a cross beam 31a, and a second rotating member 27a is mounted on a rotating shaft 25a. The metallic member 300 is placed and held on the second rotating member 27a. The difference between the machine tool 100/200 is that, a mounting seat 43a of the machine tool 200 is slidably mounted on the sliding saddle 41a and capable of sliding along the Z1-axis direction relative to the sliding saddle 41a, and a lathe tool 49a is slidably mounted on the mounting seat 43a.

When the lathe feeding mechanism 40 is used to machine the top portion 301 of the metallic member 300, the pair of first driving mechanisms 35 drives the cross beam 31 to slide along the X-axis, and the second driving mechanism 37 drives the lathe feeding mechanism 40 to move along the Y-axis. In such a way that the lathe tool 49a arrives at an original position above the worktable 20 for machining. Then the mounting seat 43a drives the lathe tool 49a to move downward along the Z1-axis to reach a preset position near the middle portion of the metallic member 300. Finally, the pair of feeding assemblies 47 drives the lathe tool 49a to reciprocate at a high speed along the Z-axis according to the depth of cutting required for each machining portion of the top portion 301 to machine the rotary metallic member 300 circumferentially. Because the mounting seat 43a can slide along the Z1-axis to place the lathe tool 49a at the preset position, a reciprocally moving distance of the lathe tool 49 relative to the metallic member 300 can be reduced, thereby enhancing a reaction response of the lathe tool 49a.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A machine tool with a lathe tool and a scraping cutter, the machine tool comprising:
   a machine support;
   a worktable for rotating a workpiece and positioned on the machine support;
   a moving device slidably assembled to the machine support so as to slide along a first direction and located above the worktable;
   a lathe feeding mechanism slidably assembled to the moving device so as to slide along a second direction perpendicular to the first direction, the lathe feeding mechanism comprising a feeding assembly and the lathe tool, with the lathe tool connected to the feeding assembly, the feeding assembly being configured for driving the lathe tool to move reciprocally along a third direction substantially perpendicular to the first and the second direction, the lathe feeding mechanism further including:
      a mounting seat fittingly assembled to a sliding saddle, the sliding saddle being slidably connected to the moving device so as to slide along the second direction, the mounting seat including a frame including first and second opposed side walls that cooperatively define a receiving space therebetween, wherein a through groove is defined in the second side wall, wherein the lathe tool is mounted to a T-shaped tool holder, wherein the T-shape of the T-shaped tool holder is formed by a main body and a sliding board, the sliding board extending through the through groove and being slidably engaged, for movement in the third direction, with a guiding portion mounted on the first side wall and within the receiving space, wherein the feeding assembly acts on two sides of the T-shaped tool holder, and wherein the main body include a holding portion that is slidably engaged, for movement in the third direction, with a guiding portion mounted on the second side wall; and
   a scraping feeding mechanism slidably assembled to the moving device so as to slide along the second direction, the scraping feeding mechanism being adjacent to the lathe feeding mechanism, wherein the scraping feeding mechanism comprises a rotatable driving member and the scraping cutter, wherein the rotatable driving member is configured to drive the scraping cutter to rotate to a certain angle, thereby enabling the scraping cutter to scrape the workpiece, and wherein the scraping feeding mechanism is configured for driving the scraping cutter to move along the third direction.

2. The machine tool of claim 1, wherein the feeding assembly is received in the mounting seat, and the scraping cutter is slidably mounted on the sliding saddle and adjacent to the mounting seat, and the scraping cutter is capable of moving along the third direction relative to the mounting seat.

3. The machine tool of claim 2, wherein the scraping feeding mechanism comprises a linear driving assembly, the linear driving assembly is mounted on the sliding saddle, the rotatable driving member is connected to the linear driving assembly, the linear driving assembly drives the rotatable driving member and the scraping cutter to move along the third direction, and the rotatable driving member is capable of driving the scraping cutter to rotate.

4. The machine tool of claim 3, wherein the sliding saddle comprises a mounting block, the linear driving assembly comprises a driving member, a leading rod, and a nut, the driving member of the linear driving assembly is mounted on the sliding saddle, the leading rod interconnects the linear driving assembly driving member and the mounting block, the nut is sleeved on and engages with the leading rod, the scraping feeding mechanism further comprises a linking board fixed to the nut and slidably engaged with the sliding saddle, and the rotatable driving member is fittingly assembled to the linking board.

5. The machine tool of claim 4, wherein the sliding saddle further comprises two sets of guiding rails, the mounting block is located between the two sets of guiding rails, and the linking board is slidably assembled to the two sets of guiding rails.

6. The machine tool of claim 1, wherein the mounting seat comprises a further guiding portion mounted on the first side wall, extending along the third direction, and wherein the tool holder is slidably assembled to the guiding portions mounted on the first side wall.

7. The machine tool of claim 6, wherein the sliding board protrudes substantially perpendicularly from the main body, the main body is positioned out of the mounting seat, the sliding board is received in the mounting seat and is slidably assembled to the guiding portions that are mounted on the first side wall, and the lathe tool is mounted on the main body.

8. The machine tool of claim 7, wherein the feeding assembly comprises at least one forcer and at least one stator corresponding to the at least one forcer, the at least one forcer is fixed to the mounting seat, and the at least one stator is positioned on the sliding board.

9. The machine tool of claim 1, wherein the worktable is capable of rotating about an axis parallel to the third direction.

10. The machine tool of claim 1, wherein the worktable comprises a pair of mounting bases, a first rotating member, a rotating shaft, and a second rotating member, the first rotating member is mounted on one of the two mounting bases, the rotating shaft interconnects the first rotating member and the other one of the two mounting bases, the second rotating member is positioned on the rotating shaft and is capable of rotating about an axis parallel to the third direction, and the first rotating member is capable of rotating the rotating shaft about an axis parallel to the second direction.

11. A machine tool with a lathe tool and a scraping cutter, the machine tool comprising:
a machine support comprising:
   a base and a pair of support bodies positioned on the base;
the machine tool further comprising:
   a worktable for rotating a workpiece and positioned on the base between the pair of support bodies;
   a moving device comprising a cross beam having opposite ends slidably positioned on the support bodies, the cross beam being capable of sliding along a first direction and located above the worktable;
   a lathe feeding mechanism slidably assembled to the cross beam so as to slide along a second direction perpendicular to the first direction, the lathe feeding mechanism comprising the lathe tool and including a feeding assembly configured for driving the lathe tool to move reciprocally along a third direction substantially perpendicular to the first and second direction, the-lathe feeding mechanism further including:
      a mounting seat fittingly assembled to a sliding saddle, the sliding saddle being slidably connected to the cross beam so as to slide along the second direction, the mounting seat including a frame including first and second opposed side walls that cooperatively define a receiving space therebetween, wherein a through groove is defined in the second side wall, wherein the lathe tool is mounted to a T-shaped tool holder, wherein the T-shape of the T-shaped tool holder is formed by a main body and a sliding board, the sliding board extending through the through groove and being slidably engaged, for movement in the third direction, with a guiding portion mounted on the first side wall and within the receiving space, wherein the feeding assembly acts on two sides of the T-shaped tool holder, and wherein the main body includes a holding portion that is slidably engaged, for movement in the third direction, with a guiding portion mounted on the second side wall; and
   a scraping feeding mechanism slidably assembled to the cross beam so as to slide along the second direction perpendicular to the first direction, the scraping feeding mechanism being adjacent to the lathe feeding mechanism, wherein the scraping feeding mechanism comprises a rotatable driving member and the scraping cutter, wherein the rotatable driving member is configured to drive the scraping cutter to rotate to a certain angle, thereby enabling the scraping cutter to scrape the workpiece, and wherein the scraping feeding mechanism is configured for driving the scraping cutter to move along the third direction.

12. The machine tool of claim 11, wherein along the second direction, the feeding assembly is received in the mounting seat, and the lathe tool is slidably mounted on the mounting seat, the scraping feeding mechanism is mounted on the sliding saddle adjacent to the mounting seat, and the scraping cutter is capable of moving along the third direction relative to the mounting seat.

13. The machine tool of claim 12, wherein the scraping feeding mechanism comprises a linear driving assembly, the linear driving assembly is mounted on the sliding saddle, the rotatable driving member is connected to the linear driving assembly, the linear driving assembly drives the rotatable driving member and the scraping cutter to move along the third direction to adjust the feed of the scraping cutter relative to the workpiece, and the rotatable driving member is capable of driving the scraping cutter to rotate.

14. The machine tool of claim 13, wherein the sliding saddle comprises a mounting block, the linear driving assembly comprises a driving member, a leading rod, and a nut, the driving member of the linear driving assembly is mounted on the sliding saddle, the leading rod interconnects the linear driving assembly driving member and the mounting block, the nut is sleeved on and engages with the leading rod, the scraping feeding mechanism further comprises a linking board fixed to the nut and slidably engaged with the sliding saddle, and the rotatable driving member is fittingly assembled to the linking board.

15. The machine tool of claim 14, wherein the sliding saddle further comprises two sets of guiding rails, the mounting block is located between the two sets of guiding rails, and the linking board is slidably assembled to the two sets of guiding rails.

16. The machine tool of claim 11, wherein the mounting seat comprises a further guiding portion mounted on the first side wall, extending along the third direction, and wherein the tool holder is slidably assembled to each of the guiding portions mounted on the first side wall.

17. The machine tool of claim 16, wherein the sliding board protrudes substantially perpendicularly from the main body, the main body is positioned out of the mounting seat, the sliding board is received in the mounting seat and is slidably assembled to each of the guiding portions mounted on the first side wall.

18. The machine tool of claim 17, wherein the feeding assembly comprises at least one forcer and at least one stator corresponding to the at least one forcer, the at least one forcer is fixed to the mounting seat, and the at least one stator is positioned on the sliding board.

19. The machine tool of claim 11, wherein the worktable is capable of rotating about an axis parallel to the third direction.

20. The machine tool of claim 11, wherein the worktable comprises a pair of mounting bases, a first rotating member, a rotating shaft, and a second rotating member, the first rotating member is mounted on one mounting base, the rotating shaft interconnects the first rotating member and the other one mounting base, the second rotating member is positioned on the rotating shaft and is capable of rotating about an axis parallel to the third direction, and the first rotating member is capable of rotating the rotating shaft about an axis parallel to the second direction.

* * * * *